United States Patent
Clynne et al.

(10) Patent No.: US 10,914,710 B2
(45) Date of Patent: Feb. 9, 2021

(54) ULTRASONIC BRIDGE FOR WIRELESS COMMUNICATION

(71) Applicant: GE LIGHTING SOLUTIONS, LLC, East Cleveland, OH (US)

(72) Inventors: Thomas Clynne, East Cleveland, OH (US); Rick Dean Dureiko, Willoughby, OH (US)

(73) Assignee: Savant Technologies LLC, East Cleveland, OH (US)

( * ) Notice: Subject to any disclaimer, the term of this patent is extended or adjusted under 35 U.S.C. 154(b) by 392 days.

(21) Appl. No.: 15/944,699

(22) Filed: Apr. 3, 2018

(65) Prior Publication Data

US 2018/0287714 A1  Oct. 4, 2018

Related U.S. Application Data

(60) Provisional application No. 62/481,074, filed on Apr. 3, 2017.

(51) Int. Cl.
| | | |
|---|---|---|
| G01N 29/00 | (2006.01) | |
| G01N 29/11 | (2006.01) | |
| G01N 29/07 | (2006.01) | |
| G08C 17/02 | (2006.01) | |
| G08C 23/02 | (2006.01) | |
| H04B 11/00 | (2006.01) | |
| G01N 29/06 | (2006.01) | |
| H04W 4/80 | (2018.01) | |
| H04W 84/18 | (2009.01) | |

(52) U.S. Cl.
CPC ............ *G01N 29/11* (2013.01); *G01N 29/07* (2013.01); *G08C 17/02* (2013.01); *G08C 23/02* (2013.01); *H04B 11/00* (2013.01); *G01N 29/0609* (2013.01); *H04M 2250/12* (2013.01); *H04W 4/80* (2018.02); *H04W 84/18* (2013.01)

(58) Field of Classification Search
USPC ........................................................ 367/134
See application file for complete search history.

(56) References Cited

U.S. PATENT DOCUMENTS

| | | | | |
|---|---|---|---|---|
| 2014/0050321 A1* | 2/2014 | Albert | ................ | A61B 5/0026 380/270 |
| 2015/0018660 A1* | 1/2015 | Thomson | ............. | A61B 5/0404 600/393 |
| 2016/0057554 A1* | 2/2016 | Lavery | .................. | H04R 3/002 381/58 |

* cited by examiner

*Primary Examiner* — James R Hulka
(74) *Attorney, Agent, or Firm* — Wood IP LLC

(57) ABSTRACT

There is provided an ultrasonic bridge for ultrasonic-based wireless communication. For example, there is provided an ultrasonic bridge that includes a microphone configured to transduce an ultrasound into an analog voltage. The ultrasonic bridge further includes hardware configured to convert the analog voltage to digital information. The ultrasonic further includes a transceiver configured to send the digital information wirelessly to a remote device via one of an RF link and a light-based link.

20 Claims, 2 Drawing Sheets

ULTRASONIC BRIDGE FOR WIRELESS COMMUNICATION

CROSS-REFERENCE TO RELATED APPLICATIONS

The present disclosure claims the benefit of U.S. provisional patent application No. 62/481,074, filed Apr. 3, 2017, the contents of which are incorporated by reference herein in their entirety.

BACKGROUND

The recent explosion of wirelessly controlled devices utilizing radio frequency (RF) based control protocols (such as Bluetooth, Wi-Fi, and the like) have ushered in a new era of convenience and lifestyle improvements. Many of these improvements have entered the home and workplace in the form of wirelessly controlled lighting devices, thermostats, window shades, and other similar devices.

In many instances, human interaction with these devices may be provided by use of readily available smartphone or other handheld devices. These devices include components that also utilize similar Bluetooth, Wi-Fi, and similar wireless control means. The use of such devices typically requires that they be carried by the user or available as part of the environment which the user enters or occupies.

Further, it is often necessary that the handheld device be paired, or authenticated, with the wirelessly controlled devices by utilizing security and coordination protocols. These protocols can be cumbersome to implement and can sometimes impose an impediment to the ability of the user to effectively interact with the wireless device. These protocols and methods may also require advanced knowledge of the pairing process and can be prone to faulty operation. In some instances, the pairing process and occurrence of faults may require re-initialization of the system to achieve proper operation of the device.

SUMMARY

The embodiments presented herein help solve or mitigate the aforementioned issues. For example, the embodiments may allow the easy interfacing with connected devices without specific access to an RF network. In one use case, an exemplary embodiment can be used to commission one or more lighting by using a cell phone or voice commands, without connected to an RF network that supports the lighting system.

One embodiment provides an ultrasonic bridge that includes a microphone configured to transduce an ultrasound into an analog voltage. The ultrasonic bridge further includes hardware configured to convert the analog voltage to digital information. The ultrasonic further includes a transceiver configured to send the digital information wires sly to a remote device via one of an RF link and a light-based link.

Another embodiment provides an ultrasonic bridge that includes hardware configured to output an ultrasound tone including an instruction for a first remote device. The ultrasonic bridge further includes hardware configured to receive device information wirelessly from a second remote device via one of an RF link and a light-based link. The ultrasound tone corresponds to the device information.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
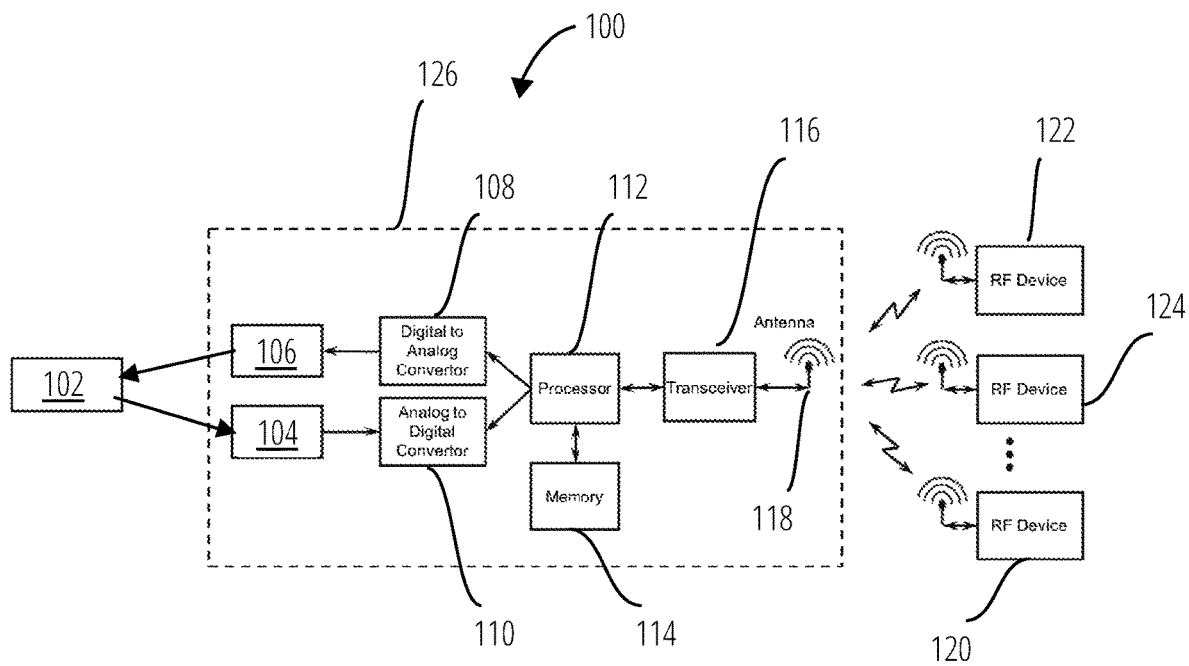
FIG. 1 illustrates a system in accordance with one embodiment.

FIG. 1 shows an exemplary system 100 according to one embodiment. The system 100 includes a bridge 126 that includes a microphone 104, a speaker 106, a digital-to-analog converter (DAC) 108, an analog-to-digital converter (ADC) 110, a processor 112, a memory 114, a transceiver 116, and an antenna 118. The bridge 126 is configured to provide two-way or one-way connectivity between a smart phone 102 and an RF device 120, an RF device 122, and an RF device 124. The smart phone 102 is shown as an example, but other device that can output either an audio tone or an ultrasonic tone.

In one exemplary implementation, the RF devices 120, 122, and 124 can each function according to a communication protocol configured to support either Wi-Fi or Bluetooth. Nevertheless, generally, the RF devices 120, 122, and 124 can each support an RF-based protocol that provides wireless connectivity between to the smart phone 102 via the bridge 126.

For example, either one of the RF device 122, RF device 120, and the RF device 124 can be an RF communication module of a connected IoT device, such as a lighting system, a home security system, a smart speaker, an entertainment system, a smart TV, to name a few possibilities. As such, the exemplary system 100 can allow a smart phone 102 to emit a an ultrasonic tone that gets converted into an instruction via the bridge 126 into an RF packet that can control a specific device.

The DAC 108 is configured to receive a digital command from the processor 112 and output analog voltage that can drive the speaker 106 to output a tone that can be picked up by the smart phone 102 and processed thereon using software that can map specific tones to information. Without limitation but by example, the DAC 108 can be any one of an R-2R ladder-based DAC, a resistor string DAC, a current steering DAC, a charge scaling DAC, a cyclic DAC, and a pipeline DAC. Generally, the system 100 is not limited to a particular DAC architecture, and one of ordinary skill in the art will readily recognize a suitable DAC architecture based on application-specific constraints.

The ADC 110 is configured to convert an analog output of the microphone 104 into a digital word that can be, for example, an instruction that can be transceived to the RF devices via the transceiver 116. Again, similarly to the DAC 108, the ADC 110 is configured to provide a one-to-one correspondence between its input and output signals. Stated otherwise, the ADC 110 can output digital word that is unique to a specific analog voltage level at its input port. As in the case of the DAC 108 the system 100 is not limited to a particular ADC architecture. For example, and not by limitation, the ADC 110 can be any one of a flash ADC, a pipeline ADC, a single-slope ADC, a successive approximation ADC, and a charge redistribution successive approximation ADC, to name a few architectures that are possible.

The processor 112 is an application-specific microprocessor or computing device that is programmed by the instructions included in a memory 114 to perform tasks specific to ultrasonic communication. Generally, the processor 112 is an apparatus that is structured such that it can perform tasks related to ultrasonic sensing and or presence sensing that would not be otherwise possible with a routine or conventional computer.

Figure 2:
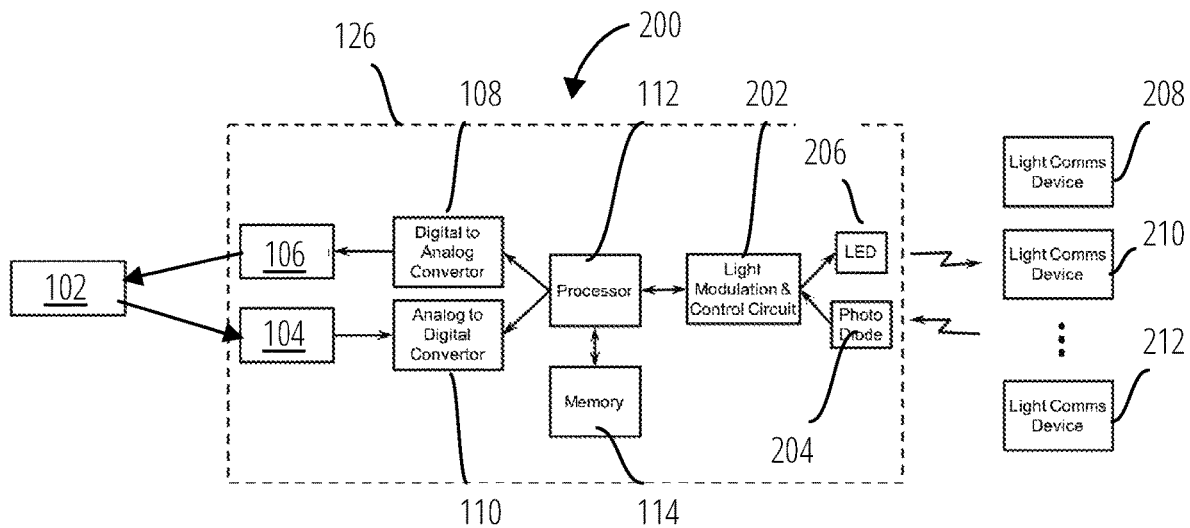
FIG. 2 illustrates a system in accordance with another embodiment.

FIG. 2 illustrates an alternate embodiment of the system 100. The system 200 includes, instead of an RF transceiver like the transceiver 116, may include a light transceiver that includes an optical modulator 202, a photodiode 204, and a light-emitting diode (LED) 206. As such, the system 200 can convert audio or ultrasonic tones from the smart phone 102 to an instruction that is broadcast as infrared light, for example.

The instruction can be intended for any one of light communication device 208, light communication device 210, and light communication device 212, which may be light transceiver modules of connected devices. As a matter of example, and not by limitation, these devices may be a smart TV, a smart speaker, a light system, a home entertainment system.

Those skilled in the relevant art(s) will appreciate that various adaptations and modifications of the embodiments described above can be configured without departing from the scope and spirit of the disclosure.

Generally, while the embodiments have been described in the context of a smart phone transmitting and receiving acoustic tones from the ultrasonic bridge, which at the other end communicates via light-based or RF communication protocols, the embodiments can be used in other scenarios.

For example, the exemplary ultrasonic bridges described herein can be used as part of a network of devices that communicate with one another using ultrasounds and traditional communication protocols like RF or IR protocols. Therefore, it is to be understood that, within the scope of the appended claims, the teachings featured herein may be practiced other than as specifically described herein.

What is claimed is:

1. An ultrasonic bridge comprising:
a processor;
a digital-to-analog converter configured to receive a digital command from the processor and output a first ultrasonic tone to an external device;
a microphone configured to transduce a second ultrasonic tone from the external device into an analog voltage;
hardware configured to convert the analog voltage to a digital word unique to a level of the analog voltage; and
a transceiver configured to send the digital word wirelessly to a remote device via one of an RF link and a light-based link for controlling the remote device via the external device.

2. The ultrasonic bridge of claim 1, wherein the RF link is one of Bluetooth, ZigBee, and Wi-fi.

3. The ultrasonic bridge of claim 1, wherein the light-based link is an infrared (IR) link.

4. The ultrasonic bridge of claim 1, wherein the external device is a smart phone device.

5. The ultrasonic bridge of claim 1, wherein the remote device is a lighting system.

6. The ultrasonic bridge of claim 1, wherein the remote device is one of a smart TV and a speaker system.

7. The ultrasonic bridge of claim 1, wherein the transceiver is further configured to receive device information from the remote device wirelessly.

8. The ultrasonic bridge of claim 7, wherein the device information is received via one of the RF link and the light-based link.

9. The ultrasonic bridge of claim 8, wherein the ultrasonic bridge is further configured to output the device information as an acoustic signal.

10. An ultrasonic bridge comprising:
hardware configured to output an ultrasonic tone including an instruction for a first remote device;
hardware configured to convert an analog voltage corresponding to the ultrasonic tone into a digital word unique to a level of the analog voltage; and
hardware configured to receive device information wirelessly from a second remote device via one of an RF link and a light-based link;
wherein the ultrasonic tone corresponds to the device information for controlling the second remote device via the first remote device.

11. The ultrasonic bridge of claim 10, further comprising an digital-to-analog converter configured to output a drive voltage for a speaker to produce the ultrasonic tone.

12. The ultrasonic bridge of claim 10, further comprising a transceiver configured to receive the device information via the RF link.

13. The ultrasonic bridge of claim 10, further comprising a light-based transceiver link.

14. The ultrasonic bridge of claim 10, further comprising a processor and a memory.

15. The ultrasonic bridge of claim 10, wherein the first remote device is a smart phone.

16. The ultrasonic bridge of claim 10, wherein the first remote device is a tablet personal computer.

17. The ultrasonic bridge of claim 10, wherein the first remote device is a first lighting system and the second remote device is a lighting system.

18. The ultrasonic bridge of claim 10, wherein the second remote device is a lighting system and the first remote device is a smart phone.

19. The ultrasonic bridge of claim 10, wherein the ultrasonic bridge is configured to provide connectivity between a smart phone and a plurality of devices.

20. The ultrasonic bridge of claim 19, wherein the plurality of devices are connected to an RF network or accessible via an infrared transceiver link.

* * * * *